(No Model.)

J. PUSEY.
PARALLEL PLIERS.

No. 597,740. Patented Jan. 25, 1898.

Witnesses.
Walter C Pusey.
John R. Nelson.

Inventor.
Joshua Pusey.

UNITED STATES PATENT OFFICE.

JOSHUA PUSEY, OF LIMA, PENNSYLVANIA.

PARALLEL PLIERS.

SPECIFICATION forming part of Letters Patent No. 597,740, dated January 25, 1898.

Application filed January 7, 1897. Serial No. 618,251. (No model.)

*To all whom it may concern:*

Be it known that I, JOSHUA PUSEY, a citizen of the United States, and a resident of Lima, in the township of Middletown, county of Delaware, and State of Pennsylvania, have invented certain new and useful Improvements in Parallel Pliers, of which the following is a full, clear, and exact description, reference being had to the accompanying drawings, of which—

Figure 1:
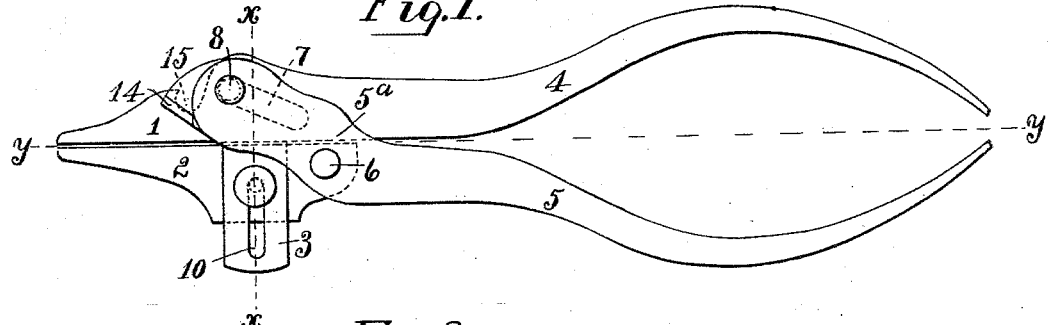
Figure 2:
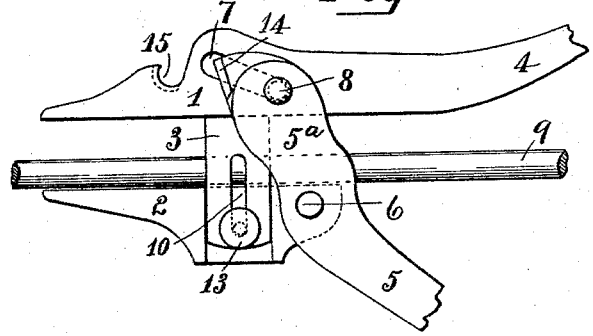
Figure 3:
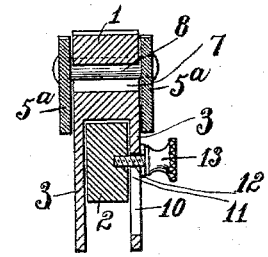
Figure 4:
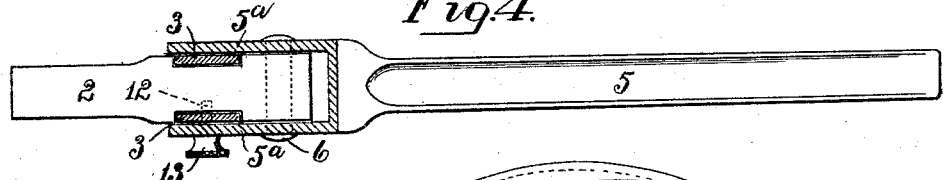
Figure 5:
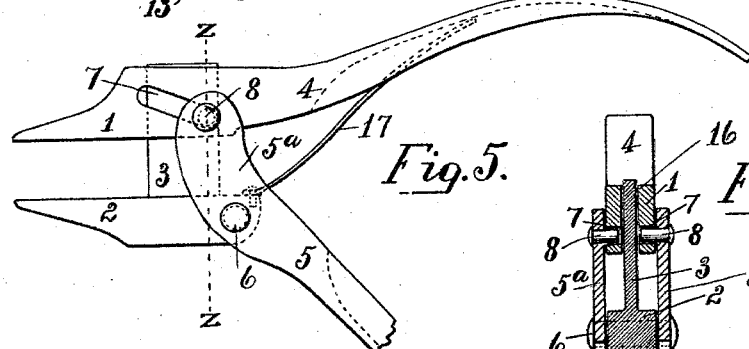
Figure 6:
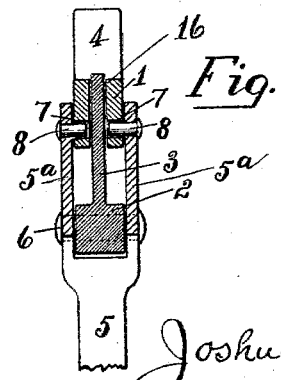

Figure 1 is a side elevation, the jaws being closed; Fig. 2, a similar elevation, the jaws being open to their full extent, part of the handles being broken off; Fig. 3, a vertical section on line $xx$, Fig. 1, looking toward the front; Fig. 4, a horizontal section on line $yy$, Fig. 1; Fig. 5, a side elevation of a modified form of the invention, the jaws being open and a part of the pivoted handle broken off; Fig. 6, a vertical section on line $zz$, Fig. 5, looking toward the rear.

The object of this invention is to provide parallel-jaw pliers that shall be capable of being readily and cheaply made, strong, efficient, durable, and composed of a minimum of parts.

The invention consists of the combination of two jaws similar to those of ordinary pliers, a connecting guide-stem fixed to one of the jaws, a handle fixedly connected to one of the jaws, a handle pivotally connected to the other jaw and provided with parts or projections that are adapted to impinge and slide against the non-pivoted jaw, the construction, combination, and operation being such, as hereinafter described, that when the handles are moved outwardly from each other the jaws will be caused to move away from each other and, conversely, when the handles are moved toward each other the said jaws will be caused to approach each other, always, however, maintaining their parallel relation.

The invention consists, further, in certain details of construction, and also in the combination, with the parts or elements hereinbefore mentioned, of means for maintaining the jaws fixedly at any desired distance apart within the scope of their movement, whereby the implement is adapted to be used as a hand-vise as well as pliers.

Referring first to Figs. 1 to 4, both inclusive, which represent the complete invention in its preferred form, 1 and 2 are the jaws of usual form. The jaw 1, which is the sliding jaw, is provided with a bifurcated stem 3, that embraces the jaw 2, hereinafter termed the "pivoted" jaw, this latter jaw being cut away on each side, as shown, to receive the bifurcations of the stem, so as to form a guideway for the latter. A handle 4, of any suitable shape—such, for example, as that shown in the drawings—is connected to or is, as in the present instance, an integral extension of the rear part of jaw 1, and 5 is a similar handle, but bifurcated at its front end, to which the rear or inner end of jaw 2 is pivoted on a pin or rivet 6, that passes through the bifurcations $5^a$ of the handle and through said jaw 2.

In the head of the sliding jaw 1 is an inclined slot 7, through which passes a pin or rivet 8, that is connected to the bifurcations $5^a$, which latter, as shown, project forward beyond the pivot-pin 6.

When the jaws are closed, as in Fig. 1, the pin 8 is at the forward end of the said slot.

The operation is as follows: When the handles are separated or one moved away from the other, the handle 5 or the jaw 2, as the case may be, turns on pivot 6, and consequently pin 8 travels back in slot 7. This obviously causes the jaw 1 to slide away from its fellow or the latter to slide away from jaw 1, the working faces of the jaws, as hereinbefore stated, remaining parallel with each other, as shown in Fig. 2. When the handles are brought toward each other, the jaws will be caused to firmly and squarely grip an article—say a piece of wire 9, Fig. 2—placed between them.

As it is sometimes desirable to hold the jaws positively in position when the article is gripped between the same without the necessity of maintaining hand-pressure upon the handles—in other words, to use the implement as a hand-vise—I make an elongated slot 10 in one of the bifurcations of the stem and provide a screw-threaded hole 11 in the side of jaw 2 for the reception of a screw 12, that passes through the said slot and has a milled head 13 on its end. By turning the screw so that the head or an interposed washer will be brought against the bifurcation the latter, and consequently the jaws, will be held fixed in the desired position, but may, of course, be readily released by unscrewing the said screw. Various other devices may be used for this purpose, but I believe the foregoing to be the simplest and most desirable.

A cutting device may also be readily connected to the pliers—such, for example, as that shown in Figs. 1 and 2—which consists of a knife or blade 14, that is secured to and projects forward from the free end of one of the bifurcations of the pivoted handle 5 in conjunction with a suitably-located slot or recess 15 in the upper side of the jaw 1 for receiving a piece of wire or the like.

The form or modification of my invention illustrated in Figs. 5 and 6 differs from that of the previously-described form only in that the stem 3 is not bifurcated, but is attached to about midway of the pivoted jaw 2 and passes through a slot or mortise 16 in the jaw 1, which latter jaw is adapted to slide on the stem and is provided with slots or grooves 7, (one on each side,) into which respectively enters a pin or stud 8, that is secured to the bifurcation of the pivoted handle. An advantage, however, of the first-described form of the invention (with the bifurcated stem) is that a wide free passage-way is afforded for the wire 9 or the like when placed longitudinally between the jaws, as seen in Fig. 2. There is also an advantage in attaching the stem to the jaw 1, whether the stem be bifurcated or not, in that a through-slot may be used, and thus the parts may be held together simply by two screws or pins 6 and 8, the former passing through the said slot and the latter through the jaw 2.

The slot or slots 7 might be parallel with the working face of jaw 1. I have, however, made the same inclined, as shown, in order to secure a greater throw or movement of the jaw from a slot of given length and by a given throw of the handles than would be attained if the slot were parallel with the jaw.

My invention may be made in a number of special forms, but these will always embody the combination of the pivoted and the sliding jaw connected by a guide-stem and the two handles, the one to which the jaw is pivoted having parts in sliding cam-like engagement with the sliding jaw, whereby by the to-and-fro movement of one or both of the handles with relation to each other the jaws will approach or separate from each other, as described.

I remark that, if desired, the jaws may be maintained normally apart by means of a suitable spring—as, for instance, the bent flat spring 17 (shown in Fig. 5)—one end of which is secured to the rear or inner end of the jaw 2 and its other end bears and rides against the under side of the handle 4 of jaw 1.

Having thus described my invention, I claim as new and desire to secure by Letters Patent—

1. In parallel pliers the combination of the two jaws, the connecting guide-stem, the two handles, one of which is fixed to one jaw, and the other is pivoted to the other jaw, and has an extension forward of the pivot, which extension carries a projection adapted to bear and slide against a surface of the non-pivoted jaw, whereby when the handles are brought toward each other the jaws will be caused to approach each other; together with means for causing said jaws to separate when the handles are moved away from each other substantially as and for the purpose described.

2. The improvement in parallel pliers, consisting of the combination of the two jaws, the guide-stem fixed to one of said jaws, the two handles, one of which is connected to one of said jaws, and the other is pivoted to the other jaw; together with the slot, or slots, in the non-pivoted jaw, and the pin or pins secured to the last-mentioned handle, substantially as and for the purpose set forth.

3. The improvement in parallel pliers, consisting of the combination of the two jaws, the bifurcated stem connected to one of said jaws, and adapted to slide in suitable guideways in the other jaw, the handle connected to the stem-carrying jaw, and the handle pivoted to the other jaw and having parts or projections in sliding cam-like engagement with the said stem-carrying or sliding jaw, substantially as and for the purpose set forth.

4. The improvement in parallel pliers, consisting of the combination of the jaw, 2, the bifurcated handle, pivoted thereto, the jaw, 1, having the slot therein, the bifurcated stem connected to said jaw and adapted to slide in guideways in the sides of jaw, 2, together with the rivet-pin, or the like, secured to the bifurcations of said pivoted handle, and passing through said slot, substantially as and for the purpose specified.

5. The improvement in parallel pliers, consisting of the two jaws, the guide-stem fixed to one of said jaws, the two handles, one of which is connected to one of said jaws, and the other is pivoted to the other jaw and has parts or projections in sliding cam-like engagement with the non-pivoted jaw; together with means, substantially as described for locking the jaws in any position in which they may be adjusted and releasing the same when desired, substantially as and for the purpose set forth.

6. The improvement in parallel pliers, consisting of the combination of the two jaws, the bifurcated stem connected to one of said jaws and adapted to slide in guideways in the sides of the other jaw, the handle connected to the stem-carrying jaw, the handle pivoted to said other jaw and having parts or projections in sliding cam-like engagement with the said stem-carrying jaw; together with the set-screw connected to the pivoted jaw, and extending through a slot in a bifurcation of the said stem, substantially as and for the purpose described.

In testimony whereof I have hereunto affixed my signature in the presence of two subscribing witnesses.

JOSHUA PUSEY.

Witnesses:
 JOHN R. NOLAN,
 WALTER C. PUSEY.